(12) United States Patent
Verma et al.

(10) Patent No.: US 11,756,078 B1
(45) Date of Patent: Sep. 12, 2023

(54) SYSTEMS AND METHODS FOR PROVIDING A PERSONALIZED ADVERTISEMENT SERVICE

(71) Applicant: Ford Global Technologies, LLC, Dearborn, MI (US)

(72) Inventors: Himanshu Verma, Farmington Hills, MI (US); Fling Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/659,275

(22) Filed: Apr. 14, 2022

(51) Int. Cl.
*G06Q 30/00* (2023.01)
*G06Q 30/0251* (2023.01)

(52) U.S. Cl.
CPC ..... *G06Q 30/0266* (2013.01); *G06Q 30/0271* (2013.01)

(58) Field of Classification Search
CPC ........... G06Q 30/0266; G06Q 30/0271; G06Q 30/0265
See application file for complete search history.

(56) References Cited

U.S. PATENT DOCUMENTS

| 9,898,759 | B2 | 2/2018 | Khoury |
| 2014/0201004 | A1 | 7/2014 | Parundekar et al. |
| 2021/0133810 | A1 | 5/2021 | MacNeille et al. |
| 2021/0312500 | A1* | 10/2021 | Krishnamurthy .. G06Q 30/0266 |

FOREIGN PATENT DOCUMENTS

| CN | 105501152 A | 4/2016 |
| EP | 2386993 B1 | 8/2016 |

OTHER PUBLICATIONS

Andrew Liszewski, Get Ready for In-Car Ads, GIZMODO, May 13, 2021.

* cited by examiner

*Primary Examiner* — Meredith A Long
(74) *Attorney, Agent, or Firm* — Brandon Hicks; Eversheds Sutherland (US) LLP (57) ABSTRACT

The disclosure generally pertains to systems and methods for providing a personalized advertisement service. In an example method, first information associated with a vehicle can be identified. The first information can include at least a present location of the vehicle, a present speed of the vehicle, and traffic information associated with a present route of the vehicle. Second information associated with a driver of the vehicle can also be identified. An advertisement interaction score can be calculated based at least in part on the first information and the second information. A nature of an advertisement to be displayed at a vehicle infotainment system of the vehicle can be subsequently determined. The nature of the advertisement can comprise a viewable characteristic or a clickable characteristic. The advertisement can then be displayed at the vehicle infotainment system.

19 Claims, 4 Drawing Sheets

FIG. 4

SYSTEMS AND METHODS FOR PROVIDING A PERSONALIZED ADVERTISEMENT SERVICE

BACKGROUND

Vehicle drivers may not always be in a position to interact with an advertisement presented in a vehicle, particularly in certain scenarios. For example, if the vehicle driver is driving or on a phone call, interaction with an advertisement may not be deemed likely. Thus, a watchable advertisement may be desirable in certain situations, while a clickable advertisement may be preferred in other situations.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for providing a personalized advertisement service. In an example method, first information associated with a vehicle can be identified. The first information can include at least a present location of the vehicle, a present speed of the vehicle, and traffic information associated with a present route of the vehicle. Second information associated with a driver of the vehicle can also be identified. An advertisement interaction score can be calculated based at least in part on the first information and the second information. A nature of an advertisement to be displayed at a vehicle infotainment system of the vehicle can be subsequently determined. The nature of the advertisement can comprise a viewable characteristic or a clickable characteristic. The advertisement can then be displayed at the vehicle infotainment system.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "vehicle driver" may be used interchangeably with the word "driver" and the word "user." Either word as used herein refers to any individual that is utilizing the personalized assistance service. The word "device" may be any of various devices, such as, for example, a user device such as a smartphone or a tablet, a smart vehicle, and a computer." The word "sensor" may be any of various sensors that can be found in a vehicle, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

Figure 1:
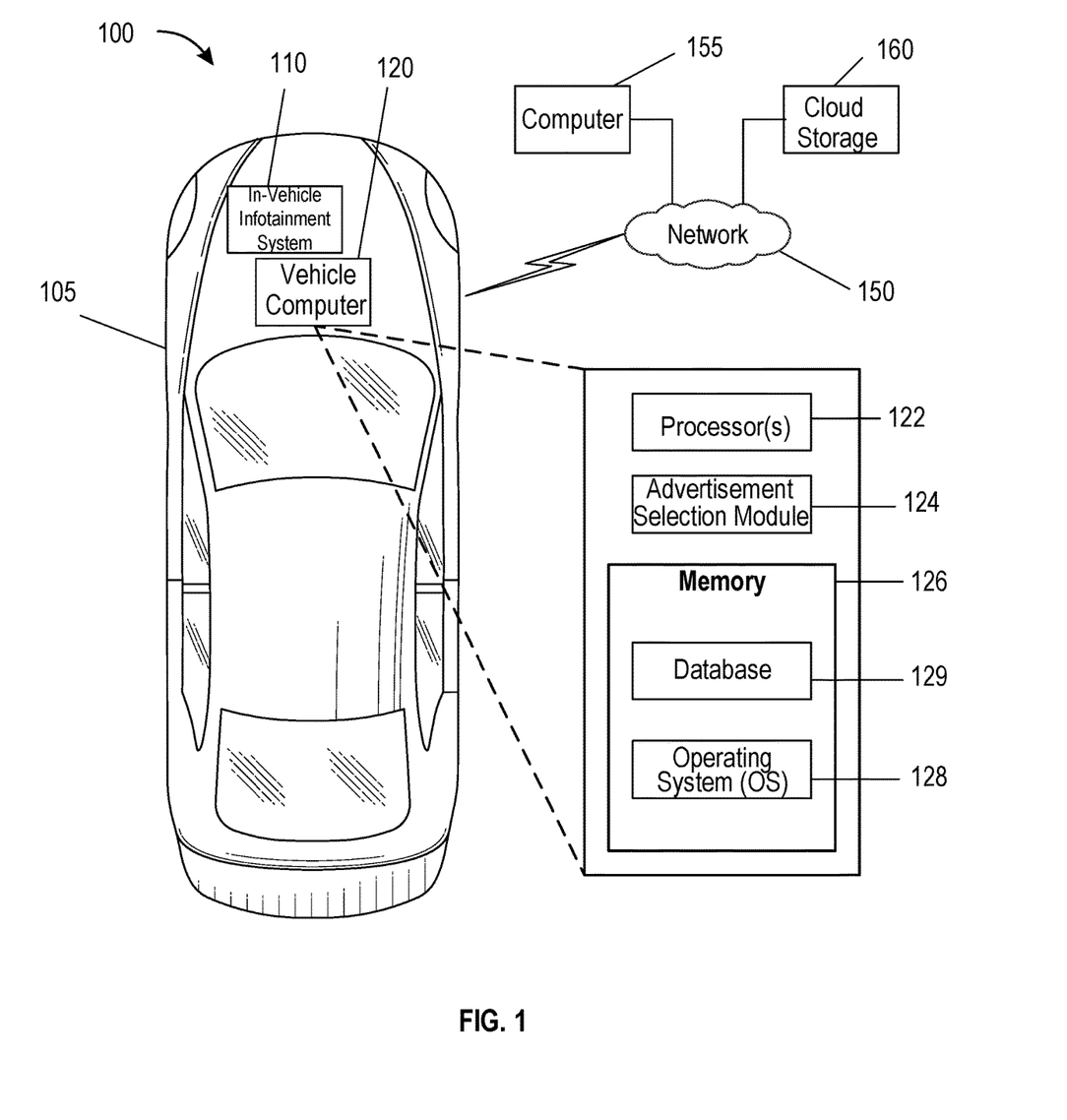
FIG. 1 illustrates an example personalized advertisement system in accordance with an embodiment of the disclosure.

FIG. 1 illustrates an example personalized advertisement system 100 for pick-up or delivery in accordance with an embodiment of the disclosure. The personalized advertisement system 100 may be implemented in a vehicle 105, which may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, or a bus.

The vehicle 105 may further include components such as, for example, an in-vehicle infotainment system 110 and a vehicle computer 120. The vehicle 105 may further include various types of sensors and detectors configured to provide various functionalities. In some embodiments, the in-vehicle infotainment system 110 may include additional components, such as a display screen. The vehicle computer 120 may perform various operations associated with the vehicle 105, such as controlling engine operations like turning the vehicle 105 on and off, fuel injection, speed control, emissions control, braking, and other engine operations. The vehicle computer 120 may also perform various operations associated with the personalized advertisement system 100.

In some embodiments, the in-vehicle infotainment system 110 and the vehicle computer 120 are configured to communicate via a network 150 with devices located outside the vehicle 105, such as, for example, a computer 155 (a server computer, a cloud computer, etc.) and/or a cloud storage 160.

The network 150 may include any one, or a combination of networks, such as, for example, a local area network (LAN), a wide area network (WAN), a telephone network, a cellular network, a cable network, a wireless network, and/or private/public networks such as the Internet. The network 150 may support any of various communications technologies, such as, for example, TCP/IP, Bluetooth®, near-field communication (NFC), Wi-Fi, Wi-Fi Direct, Ultra-Wideband (UWB), cellular, machine-to-machine communication, and/or man-to-machine communication.

In some embodiments, the vehicle computer 120 may include a processor 122, an advertisement selection module 124, and a memory 126. It must be understood that the advertisement selection module 124 is a functional block that can be implemented in hardware, software, or a combination thereof. Some example hardware components may include a display screen or the in-vehicle infotainment system 110. Some example software components may include an advertisement processing module. The processor 122 may carry out advertisement selection operations by executing computer-readable instructions stored in the memory 126. The memory 126, which is one example of a non-transitory computer-readable medium, may be used to store a database 129 for storing data and an operating system (OS) 128.

In some embodiments, the vehicle computer 120 may be configured to include various components having functions associated with executing the personalized advertisement system 100. For example, the vehicle computer 120 may be further configured to assist in determinations of an appropriate advertisement for display at the in-vehicle infotainment system 110. In an example embodiment, the in-vehicle infotainment system 110 may be communicatively coupled to the vehicle computer 120 via wired and/or wireless connections. More particularly, the in-vehicle infotainment system 110 may be communicatively coupled to the vehicle computer 120 via a vehicle bus that uses a controller area network (CAN) bus protocol, a Media Oriented Systems Transport (MOST) bus protocol, and/or a CAN flexible data (CAN-FD) bus protocol. In another embodiment, the communications may be provided via wireless technologies such as Bluetooth®, Ultra-Wideband (UWB), cellular, Wi-Fi, ZigBee®, or near-field communications (NFC).

Figure 2:
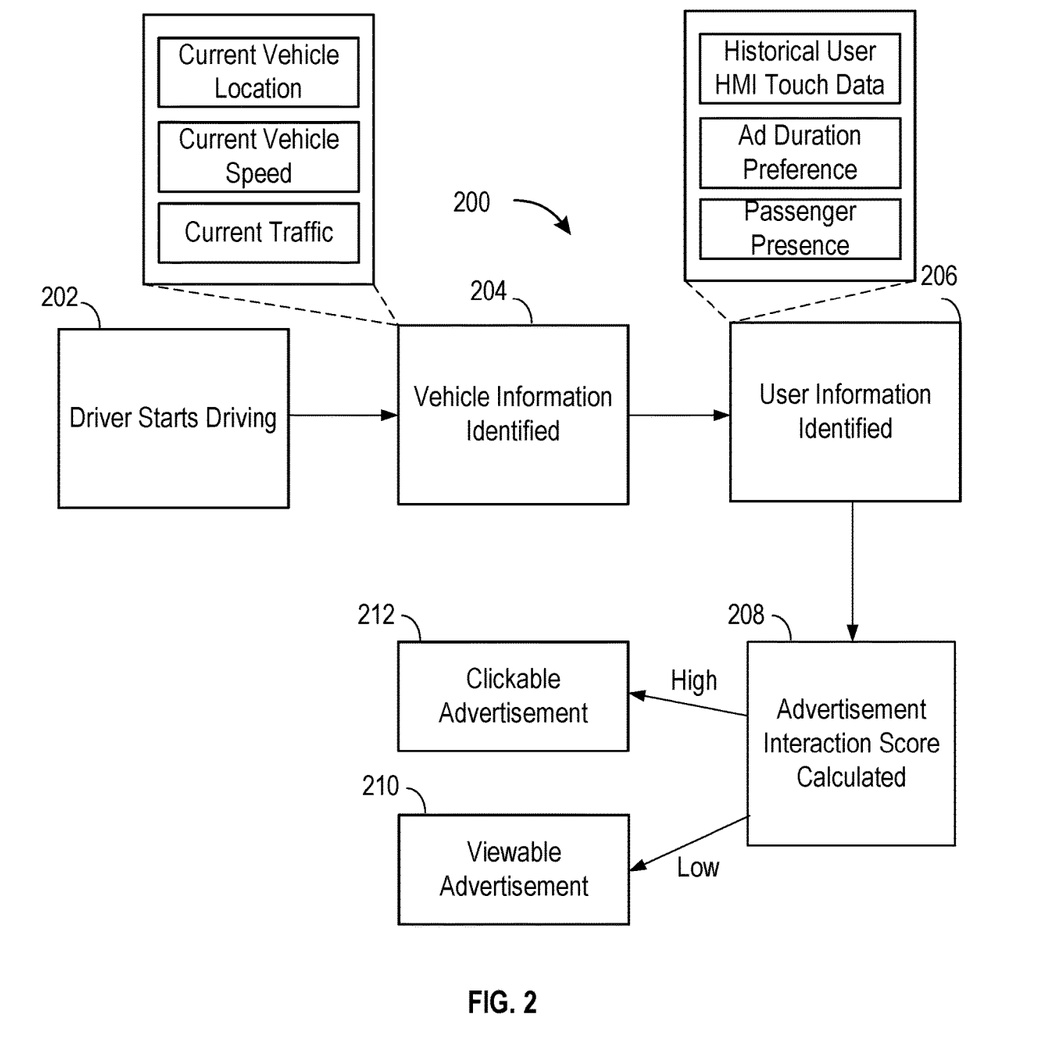
FIG. 2 illustrates an example implementation of a personalized advertisement system in accordance with an embodiment of the disclosure.

FIG. 2 illustrates an example implementation of a personalized advertisement system 200 in accordance with an embodiment of the disclosure. The personalized advertisement system 200 may be configured to detect situations where a user may be more likely to interact with an advertisement and to detect situations where a user may be more likely to view an advertisement without attempting to interact with the advertisement. In one example, a user on an inter-city highway or a user that is located proximate to a marketplace may prefer an interactive advertisement because the user may be predicted to be interested in learning about deals associated with shops in the marketplace, and because the user may be predicted to be in need of coffee, lunch, or gas when traveling to a more distant location via an inter-city highway. In another example, a user who is going home from work may not be predicted to be interested in receiving such information. Thus, to maximize the likelihood of interaction between a user and a displayed advertisement, interactive advertisements may be provided based on a user's historical behavior and present environmental and surrounding conditions.

In some embodiments, as depicted at block 202, the personalized advertisement service 200 may commence when a vehicle driver begins driving a vehicle. The vehicle may be the vehicle 105 depicted in FIG. 1. At block 204, vehicle information about the vehicle may be identified. The vehicle information may include various types of information, such as a current day and time, a current vehicle speed, traffic information at the vehicle's present location, and a current vehicle location. In some embodiments, traffic information may include whether the vehicle is currently traveling through a high traffic environment or a low traffic environment. In some embodiments, a current vehicle location may include whether the vehicle is located on a street, an inter-city highway, or a different location.

In some embodiments, at block 206, user information associated with the vehicle driver may be identified. For example, an advertisement duration preference associated with the vehicle driver may be identified. As another example, historical touch data associated with the vehicle and the human-machine interface may be identified. In some embodiments, the personalized advertisement system 200 may further take into consideration the presence of a passenger in the vehicle.

In some embodiments, at block 208, an advertisement interaction score is calculated based at least in part on the vehicle information and the user information. In some embodiments, the advertisement interaction score is calculated further based on the presence of a passenger in the vehicle. As depicted at block 210, if the advertisement interaction score is low, the personalized advertisement system 200 may display a viewable advertisement. The viewable advertisement may be displayed at a display screen, for example, the in-vehicle infotainment system 110 depicted in FIG. 1. As further depicted at block 212, if the advertisement interaction score is high, the personalized advertisement system 200 may display a clickable advertisement (which is an interactive advertisement. The distinction between a high advertisement interaction score and a low advertisement interaction score may be determined using a predetermined threshold advertisement interaction score.

In some embodiments, a current location of a vehicle may be used in part to determine whether an advertisement should be interactive or viewable. For example, familiar locations may be associated with viewable advertisements, regardless of whether the location is a side street or a highway. In contrast, unfamiliar locations such as an unfamiliar highway may be associated with clickable advertisements. A location may be unfamiliar if historical location data demonstrates that the vehicle has never traveled to the location before, if historical location data demonstrates that the vehicle has only occasionally traveled to the location before, or if historical location data demonstrates that the vehicle has traveled to the location less than a predetermined number of times. Locations such as marketplaces, whether familiar or unfamiliar, may also be associated with clickable advertisements due to the density of businesses at the location. For example, if a vehicle is traveling past a shopping mall, clickable advertisements may be displayed to provide the vehicle driver with advertisements for stores in the shopping mall. Alternatively, if a vehicle is located proximate to a business, clickable advertisements may be displayed to provide the vehicle driver with an advertisement for that business. In another example, if a vehicle is traveling on an inter-city highway, the personalized advertisement service 200 may conclude that the vehicle driver is taking a longer trip and may be seeking options for gas, coffee, and/or food. Thus, a clickable advertisement may be preferred.

In some embodiments, a vehicle speed may be used in part to determine an advertisement interaction score. For example, higher speeds may be associated with viewable advertisements, while lower and/or medium speeds may be associated with clickable advertisements. The distinction between higher speeds and lower and/or medium speeds may be determined using a predetermined threshold vehicle speed. In some embodiments, traffic information may also be used in part to determine an advertisement interaction score. For example, higher traffic may be associated with clickable advertisements, while lower and/or medium traffic may be associated with viewable advertisements. The distinction between higher traffic and lower and/or medium traffic may be determined using a predetermined threshold traffic measurement.

In some embodiments, the personalized advertisement service 200 may use historical human-machine interface (HMI) touch data to determine an advertisement interaction score. The use of historical HMI touch data may assist in identifying a user's propensity to interact with an in-vehicle infotainment system. For example, a high propensity to interact with the in-vehicle infotainment system may be associated with a clickable advertisement being displayed to the driver. In contrast, a low propensity to interact with the in-vehicle infotainment system may be associated with a viewable advertisement being displayed to the driver.

In some embodiments, the historical HMI touch data may be used in conjunction with timestamps and/or historical location data associated with the vehicle to determine an advertisement score. For example, the personalized advertisement service 200 may identify that a driver has a high propensity to interact with the in-vehicle infotainment system at a first location, while the same driver may have a low propensity to interact with the in-vehicle infotainment system at a second location. As a result, the personalized advertisement service 200 may display a clickable advertisement to the driver at the first location due to the driver's high propensity to interact with the in-vehicle infotainment system at the first location, but the personalized advertisement service 200 may display a viewable advertisement to the driver at the second location because of the driver's low propensity to interact with the in-vehicle infotainment system at the second location. In another example, the personalized advertisement service 200 may identify that a driver has a high propensity to interact with the in-vehicle infotainment system during a first period of time of the day, while the driver has a low propensity to interact with the in-vehicle infotainment system during a second period of time of the day. As a result, the personalized advertisement service 200 may display a clickable advertisement to the driver during the first period of time of the day due to the driver's high propensity to interact with the in-vehicle infotainment system during the first period of time of the day, but the personalized advertisement service 200 may display a viewable advertisement to the driver during the second period of time of the day due to the driver's low propensity to interact with the in-vehicle infotainment system during the second period of time of the day.

In some embodiments, if the personalized advertisement service 200 detects a presence of a passenger in the vehicle, the personalized advertisement service 200 may opt to display a clickable advertisement because the passenger is not driving and may be capable of interacting with the advertisement.

In some embodiments, the personalized advertisement service 200 may be further configured to provide a personalized duration and/or a skip window duration for each advertisement that is displayed at the in-vehicle infotainment system. The personalized duration may be based at least in part on historical advertisement data associated with the driver and/or the vehicle.

Figure 3:
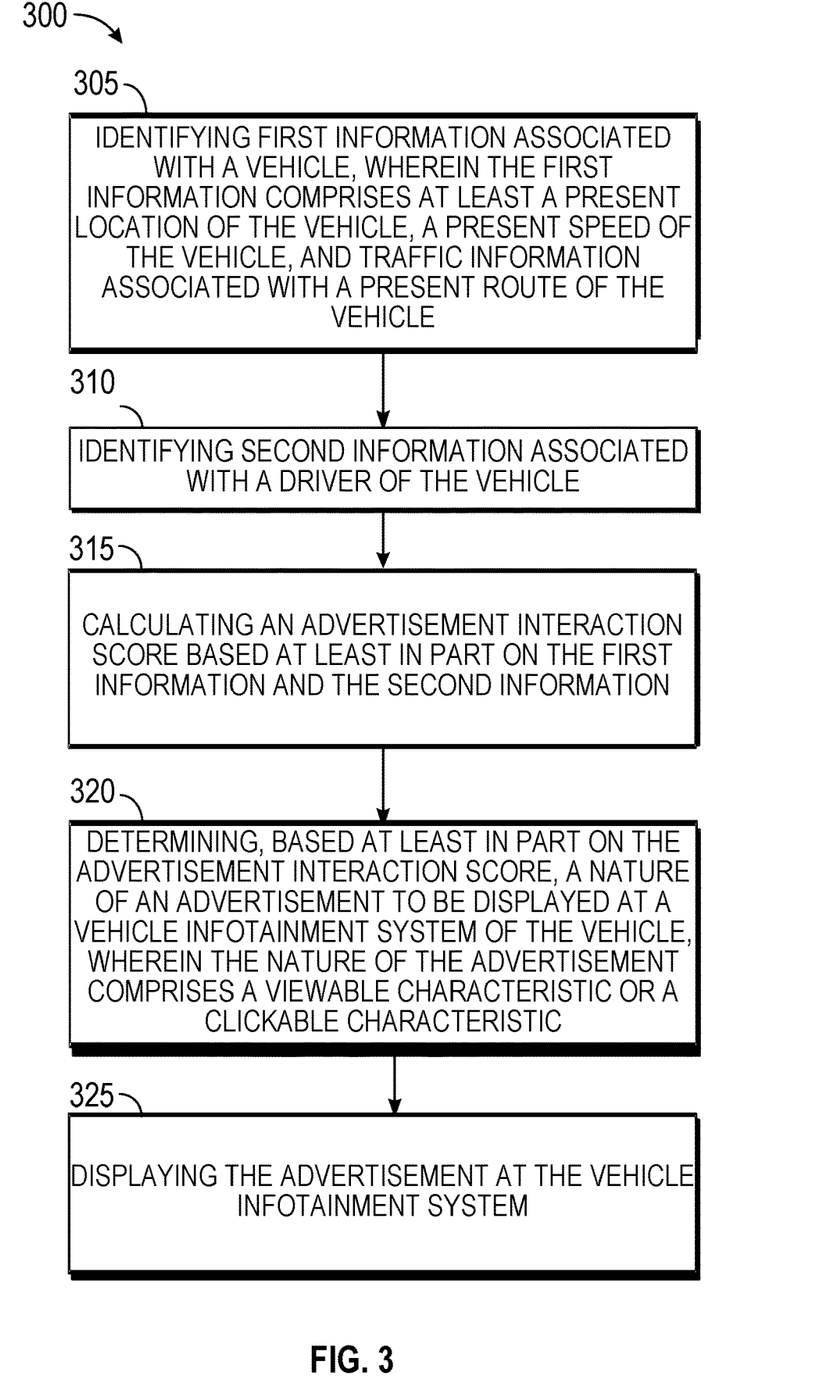
FIG. 3 depicts a flow chart of an example method for implementing a personalized advertisement service in accordance with the disclosure.

FIG. 3 shows a flow chart 300 of an example method of utilizing a personalized advertisement system in accordance with the disclosure. The flow chart 300 illustrates a sequence of operations that can be implemented in hardware, software, or a combination thereof. In the context of software, the operations represent computer-executable instructions stored on one or more non-transitory computer-readable media such as a memory 126 provided in the vehicle computer 120, that, when executed by one or more processors such as the processor 122 provided in the vehicle computer 120, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 300 may be carried out by the vehicle computer 120 either independently or in cooperation with other devices such as, for example, other components of the vehicle 105 and cloud elements (such as, for example, the computer 155 and cloud storage 160).

At block 305, first information associated with a vehicle may be identified. The first information may include at least a present location of the vehicle, a present speed of the vehicle, and traffic information associated with a present route of the vehicle.

At block 310, second information associated with a driver of the vehicle may be identified. In some embodiments, the second information associated with the driver of the vehicle may include historical advertisement preferences associated with the driver and historical touch data associated with a human-machine interface of the vehicle. In some embodiments, a high advertisement interaction score may be based at least in part on a propensity of the driver to interact with the human-machine interface of the vehicle.

At block 315, an advertisement interaction score may be calculated based at least in part on the first information and the second information. In some embodiments, the advertisement interaction score may be calculated further based at least in part on a presence of a passenger in the vehicle. In some embodiments, a high advertisement interaction score may be based at least in part on the presence of the passenger in the vehicle. In some embodiments, a high advertisement interaction score may be based at least in part on the present speed of the vehicle being low or the traffic information corresponding to high traffic levels. In some embodiments, a high advertisement interaction score may be based at least in part on the present location of the vehicle being proximate to a business.

At block 320, a nature of an advertisement to be displayed at a vehicle infotainment system of the vehicle may be determined based at least in part on the advertisement interaction score. The nature of the advertisement may comprise a viewable characteristic or a clickable characteristic.

At block 325, the advertisement may be displayed at the vehicle infotainment system.

Figure 4:
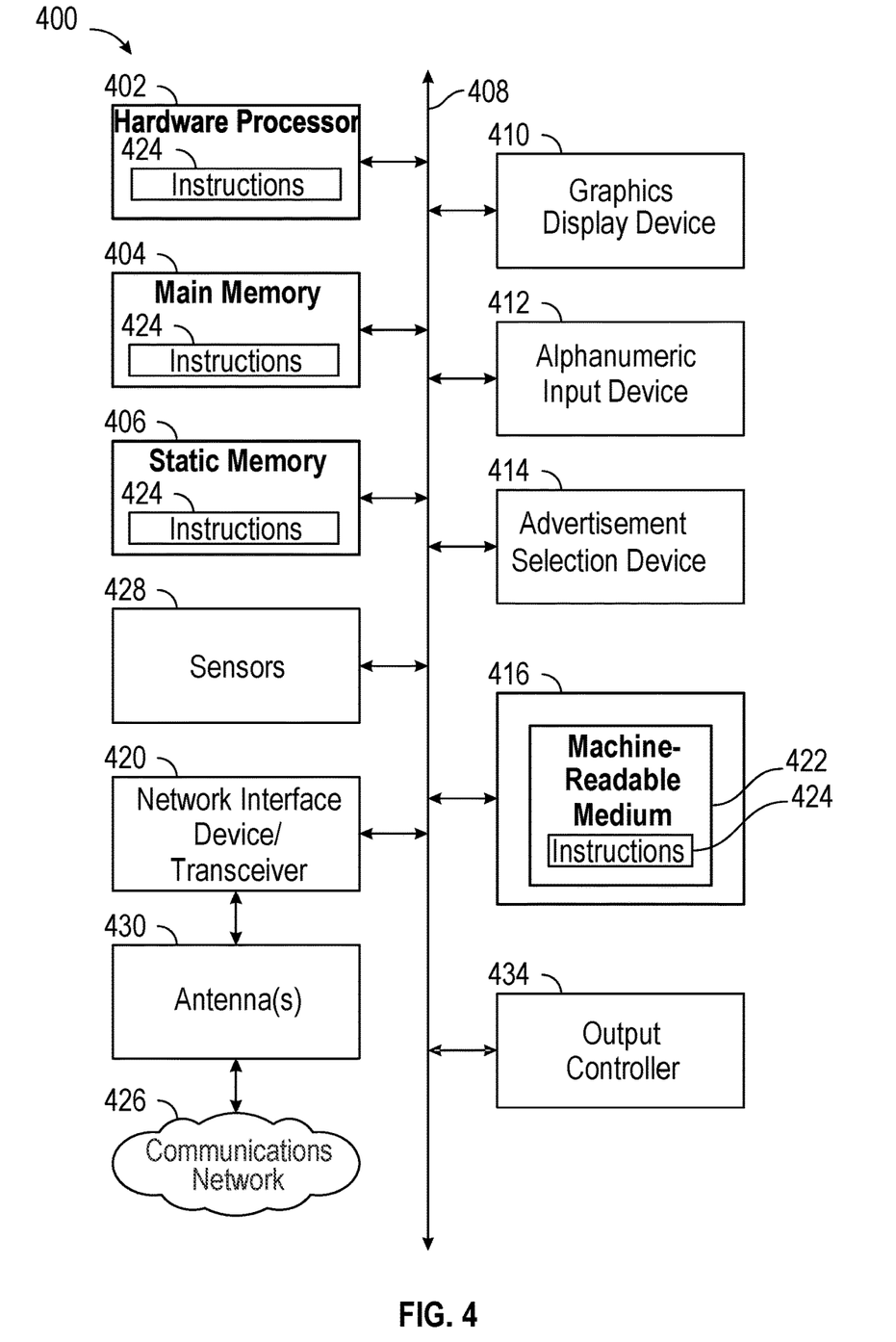
FIG. 4 depicts a block diagram of an example machine upon which any of one or more techniques (e.g., methods) may be performed, in accordance with an embodiment of the disclosure.

FIG. 4 depicts a block diagram of an example machine 400 upon which any of one or more techniques (e.g., methods) may be performed, in accordance with one or more example embodiments of the present disclosure. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. In some embodiments, the machine 400 may be the vehicle 105, as depicted in FIG. 1. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a graphics display device 410, an alphanumeric input device 412 (e.g., a keyboard), and an advertisement selection device 414. In an example, the graphics display device 410, the alphanumeric input device 412, and the advertisement selection device 414 may be a touch screen display. The machine 400 may additionally include a storage device (i.e., drive unit) 416, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 122, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 126, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a vehicle, a first number of interactions with a human-machine interface (HMI) of the vehicle while the vehicle is located at a first location;
   receiving, by the vehicle, a second number of interactions with the HMI of the vehicle while the vehicle is located at a second location;
   identifying, using one or more processors of the vehicle and based on the first number of interactions and the second number of interactions, first information associated with the vehicle, wherein the first information indicates that a likelihood of interaction with the HMI is greater at the first location than the second location;
   identifying, using the one or more processors, second information associated with a driver of the vehicle;
   calculating an advertisement interaction score based at least in part on the first information and the second information;
   determining, by the vehicle, that the vehicle is located at the first location at a first time;
   displaying, by the vehicle via the HMI and based on the advertisement interaction score and the determination that the vehicle is located at the first location, an interactive advertisement instead of a non-interactive advertisement;

determining, by the vehicle, that the vehicle is located at the second location at a second time; and displaying, by the vehicle via the HMI and based on the advertisement interaction score and the determination that the vehicle is located at the second location, a non-interactive advertisement instead of an interactive advertisement.

2. The method of claim 1, wherein the second information associated with the driver of the vehicle comprises historical advertisement preference data associated with the driver.

3. The method of claim 1, wherein the advertisement interaction score is calculated further based at least in part upon a presence of a passenger in the vehicle.

4. The method of claim 3, wherein the advertisement interaction score is based at least in part on the presence of the passenger in the vehicle.

5. The method of claim 1, wherein the advertisement interaction score is based at least in part on a present speed of the vehicle being below a first threshold value or traffic information being above a second threshold value.

6. The method of claim 1, wherein the advertisement interaction score is based at least in part on a present location of the vehicle being proximate to a business.

7. A device, comprising:
at least one memory device that stores computer-executable instructions; and
at least one processor configured to access the at least one memory device, wherein the at least one processor is configured to execute the computer-executable instructions to:
receive, by a vehicle, a first number of interactions with a human-machine interface (HMI) of the vehicle while the vehicle is located at a first location;
receive, by the vehicle, a second number of interactions with the HMI of the vehicle while the vehicle is located at a second location;
identify, by the vehicle and based on the first number of interactions and the second number of interactions, first information associated with the vehicle, wherein the first information indicates that a likelihood of interaction with the HMI is greater at the first location than the second location;
identify, by the vehicle, second information associated with a driver of the vehicle;
calculate, by the vehicle, an advertisement interaction score based at least in part on the first information and the second information;
determine, by the vehicle, that the vehicle is located at the first location at a first time;
display, by the vehicle via the HMI and based on the advertisement interaction score and the determination that the vehicle is located at the first location, an interactive advertisement instead of a non-interactive advertisement; and
determine, by the vehicle, that the vehicle is located at the second location at a second time; and
display, by the vehicle via the HMI and based on the advertisement interaction score and the determination that the vehicle is located at the second location, a non-interactive advertisement instead of an interactive advertisement.

8. The device of claim 7, wherein the second information associated with the driver of the vehicle comprises historical advertisement preference data associated with the driver.

9. The device of claim 8, wherein the advertisement interaction score is based at least in part on a propensity of the driver to interact with the human-machine interface of the vehicle.

10. The device of claim 7, wherein the advertisement interaction score is calculated further based at least in part upon a presence of a passenger in the vehicle.

11. The device of claim 10, wherein the advertisement interaction score is based at least in part on the presence of the passenger in the vehicle.

12. The device of claim 7, wherein the advertisement interaction score is based at least in part on a present speed of the vehicle being below a first threshold value or traffic information being above a second threshold value.

13. The device of claim 7, wherein the advertisement interaction score is based at least in part on a present location of the vehicle being proximate to a business.

14. A non-transitory computer-readable medium storing computer-executable instructions which, when executed by a processor, cause the processor to perform operations comprising:
receiving, by a vehicle, a first number of interactions with a human-machine interface (HMI) of the vehicle while the vehicle is located at a first location;
receiving, by the vehicle, a second number of interactions with the HMI of the vehicle while the vehicle is located at a second location;
identifying, by a vehicle or a remote computing device and based on the first number of interactions and the second number of interactions, first information associated with the vehicle, wherein the first information indicates that a likelihood of interaction with the HMI is greater at the first location than the second location;
identifying, by the vehicle or the remote computing device, second information associated with a driver of the vehicle;
calculating, by the vehicle or the remote computing device, an advertisement interaction score based at least in part on the first information and the second information;
determining, by the vehicle, that the vehicle is located at the first location at a first time;
displaying, by the vehicle via the HMI and based on the advertisement interaction score and the determination that the vehicle is located at the first location, an interactive advertisement instead of a non-interactive advertisement;
determining, by the vehicle, that the vehicle is located at the second location at a second time; and
displaying, by the vehicle via the HMI and based on the advertisement interaction score and the determination that the vehicle is located at the second location, a non-interactive advertisement instead of an interactive advertisement.

15. The non-transitory computer-readable medium of claim 14, wherein the second information associated with the driver of the vehicle comprises historical advertisement preference data associated with the driver and historical touch data associated with a human-machine interface of the vehicle.

16. The non-transitory computer-readable medium of claim 15, wherein the advertisement interaction score is based at least in part on a propensity of the driver to interact with the human-machine interface of the vehicle.

17. The non-transitory computer-readable medium of claim 14, wherein the advertisement interaction score is calculated further based at least in part upon a presence of a passenger in the vehicle.

18. The non-transitory computer-readable medium of claim 14, wherein the advertisement interaction score is based at least in part on a present speed of the vehicle being below a first threshold value or traffic information being above a second threshold value.

19. The non-transitory computer-readable medium of claim 14, wherein the advertisement interaction score is based at least in part on a present location of the vehicle being proximate to a business.

* * * * *